F. A. Mack,

Well Tubing.

No. 2,965. Reissued June 2, 1868.

Witnesses.
J. R. Dalle
Geo. H. Mott.

Inventor.
Frances A. Mack
By J. Fraser & Co
Attys

United States Patent Office.

FRANCIS A. MACK, OF NILES, MICHIGAN.

*Letters Patent No.* 57,935, *dated September* 11, 1866; *reissue No.* 2,965, *dated June* 2, 1868.

IMPROVEMENT IN WELL-TUBES.

The Schedule referred to in these Letters Patent and making part of the same.

TO ALL WHOM IT MAY CONCERN:

Be it known that I, FRANCIS A. MACK, of Niles, in the county of Berrien, and State of Michigan, did invent a certain new and useful Improvement in Well-Tubes; and I do hereby declare that the following is a full and exact description thereof, reference being had to the accompanying drawings, making part of this specification, in which—

Like letters of reference designate corresponding parts in all the figures.

Figure 1:
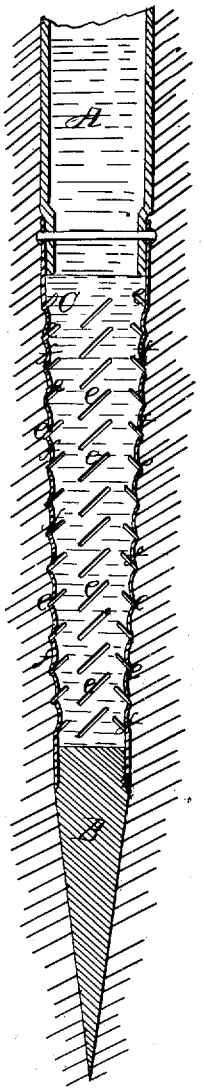
Figure 1 is a vertical section of the lower portion.
Figure 2:
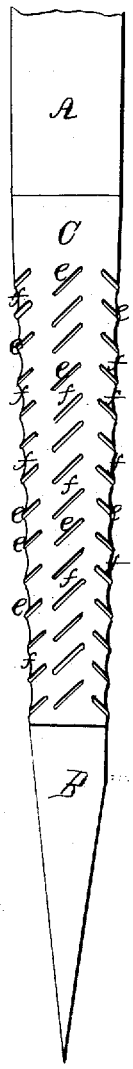
Figure 2 is a view in elevation of the same.

My improvement relates to the method of obtaining water by driving into the ground a tube, armed at the bottom with a point, and provided with perforations for the influx of the water; and the invention consists in perforating the lower portion of the tube from the inside, in such a manner as to prevent dirt or sand from entering and clogging the tube.

As indicated in the drawings, A is a portion of the tubing usually employed, to the lower end of which I secure, in any suitable manner, the perforated and (preferably) galvanized section C, armed at its bottom with the point B.

The section C is preferably conical, and provided with slits or openings *e e*, formed by cutting from the inside of the metal by a cold-chisel, or by stamping or otherwise. The incisions are most easily made by cutting them with any suitably-formed instrument in a flat plate or sheet of metal, and afterward bending it into the cylindrical shape required, with the surface from which the incisions are cut placed inside, and uniting the edges by brazing, riveting, or by any other suitable means.

By thus cutting from the inside instead of the outside, as usual, the interior of the openings *e e* is made enlarged or diverging, and a special advantage is thereby gained, in preventing, in a great degree, the collecting and clogging of sand or mud, which occurs from the contracted passages in ordinary well-tubing. The moment that sediment enters the slits or openings, the expansion or divergence of the walls surrounding the holes allows it to escape freely to the inside of the tube.

The advantages above stated are consequent on cutting the openings *e e* from the inside of any form, but I prefer to leave the space *f* between the slits concave or depressed on the outside, and convex within, and the edges or lips of the openings protruding outward, as shown, so that particles of sand, in falling, will clear the lower lips, and not enter the perforation, while the water is absorbed by capillary attraction, and any dirt that is more rapidly washed downward will take the course of the inclined indentations *f f*, and thus avoid the induction-orifices.

The manner of forming the openings in the part C enables them to be easily made of any degree of fineness required to adapt it to the different varieties of soil, from coarse sand to marl, and the finest quicksand, which is an advantage over other inventions, and one of great importance.

What I claim as my invention, is—

A well-tube, in which the openings or incisions *e e* are cut or formed from the inside, so as to leave a diminishing external projection from the inside, in the manner and for the purpose substantially as specified.

FRANCIS A. MACK.

Witnesses:

J. R. DRAKE,

GEO. W. MIATT.